(12) United States Patent
Yeo

(10) Patent No.: US 9,110,311 B2
(45) Date of Patent: Aug. 18, 2015

(54) EYEWEAR NOSE SUPPORT FOR LOW BRIDGE NOSE

(71) Applicant: Hock Wah Yeo, Berkeley, CA (US)

(72) Inventor: Hock Wah Yeo, Berkeley, CA (US)

(73) Assignee: Hock Wah Yeo, Berkeley, CA (US)

(*) Notice: Subject to any disclaimer, the term of this patent is extended or adjusted under 35 U.S.C. 154(b) by 87 days.

(21) Appl. No.: 13/965,832

(22) Filed: Aug. 13, 2013

(65) Prior Publication Data
US 2015/0049297 A1    Feb. 19, 2015

(51) Int. Cl.
*G02C 5/12*     (2006.01)
*G02C 5/02*     (2006.01)

(52) U.S. Cl.
CPC . *G02C 5/122* (2013.01); *G02C 5/02* (2013.01)

(58) Field of Classification Search
CPC .......... G02C 5/12; G02C 5/122; G02C 5/124; G02C 5/126
USPC .................................................. 351/136–139
See application file for complete search history.

(56) References Cited

U.S. PATENT DOCUMENTS

| | | | | |
|---|---|---|---|---|
| 1,282,050 A | * | 10/1918 | Day | 351/130 |
| 2,220,000 A | * | 10/1940 | Mowrer | 351/55 |
| 4,822,159 A | | 4/1989 | Gaiser | |
| 5,200,771 A | * | 4/1993 | Schmolz et al. | 351/132 |
| 6,705,724 B1 | | 3/2004 | Willis | |
| 7,648,235 B1 | | 1/2010 | Perez et al. | |
| 2012/0062832 A1 | | 3/2012 | Stanley | |

* cited by examiner

*Primary Examiner* — Huy K Mai

(57) ABSTRACT

The present invention provides a nose support device for eyewear, the nose support device comprising an adjustable nose pad attached to a cross piece that is perpendicular to an adjustable nose pad arm, the adjustable nose pad arm attaching the nose pad to the eyewear, wherein the nose pad rests on the crook of a nose bridge of a wearer of the eyewear. The present invention provides a nose support device for eyewear, the nose support device comprising an adjustable nose pad attached to a cross piece that is perpendicular to an adjustable nose pad arm, the adjustable nose pad arm attaching the nose pad to the eyewear, wherein the nose pad rests on the crook of a nose bridge of a wearer of the eyewear.

7 Claims, 3 Drawing Sheets

EYEWEAR NOSE SUPPORT FOR LOW BRIDGE NOSE

CROSS REFERENCE TO RELATED APPLICATION

This application claims priority of Provisional Application No. 61/696,723, filed Sep. 4, 2012.

BACKGROUND OF THE INVENTION

Field of the Invention

The present invention relates to an eyewear nose support piece of a frame for glasses Present eyewear frames are designed to sit on the bridge of a nose and over the ears. The part that sits on the nose is usually two side nose pads that support themselves on either side of the bridge of the nose. The two pads work well when the bridge of the nose is somewhat pronounce, however, if the bridge of the nose is low or small, they don't work as well. They have a problem keeping the eyewear from sliding down the nose or keeping them away from the face of the wearer.

SUMMARY OF THE INVENTION

The present invention provides a nose support device for eyewear, the nose support device comprising an adjustable nose pad attached to a cross piece that is perpendicular to an adjustable nose pad arm, the adjustable nose pad arm attaching the nose pad to the eye ware, wherein the nose pad rests on the crook of a nose bridge of a wearer of the eyewear.

The present invention further provides, a nose support device for eyewear, the nose support device comprising two adjustable nose pads attached to a cross piece that is perpendicular to an adjustable nose pad arm, the adjustable nose pad arm attaching the two nose pads to the eyewear, wherein the two nose pads rest on the crook of a nose bridge of a wearer of the eyewear.

The present invention also provides a nose support device for eyewear frame, the nose support device comprising an adjustable nose pad attached to a cross piece that is perpendicular to an adjustable double piece nose pad arm, wherein, one end of the nose pad arm is attached to the eyewear frame, the other to the nose pad cross piece, wherein the nose pad rests on the crook of a nose bridge of a wearer of the eyewear.

The present invention further provides a nose support device for eyewear frame, the nose support device comprising two adjustable nose pads attached to a cross piece that is perpendicular to an adjustable double piece nose pad arm, wherein, one end of the nose pad arm is attached to the eyewear frame, the other to the two nose pad cross piece, wherein the two nose pad rests on the crook of a nose bridge of a wearer of the eyewear.

The present invention further provides a flexible arm attaches the top nose pads to the frame of the eyewear. One end of the piece is attached to the either the rim or bridge of the frame, and the other, to the support cross piece holding the top nose pads. The cross piece is curved to enable the nose pads to saddle over the nasal bridge. The arm is flexible to enable the eyewear frame be moved away from the wearer's face to an optimal position.

DETAILED DESCRIPTION OF THE INVENTION

The present invention is referenced in the following detailed description and in the accompanying drawings in order to provide a full understanding of its features and advantages.

Figure 1A:
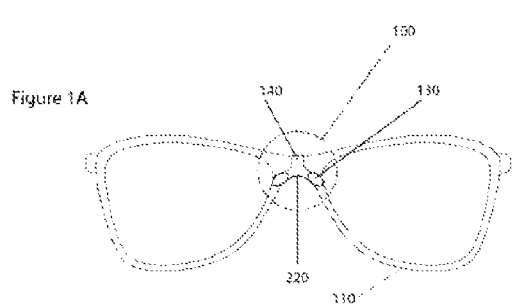
FIGS. 1a, 1b, and 1c are a front, top, side view of the nose support piece device respectively.
Figure 1C:
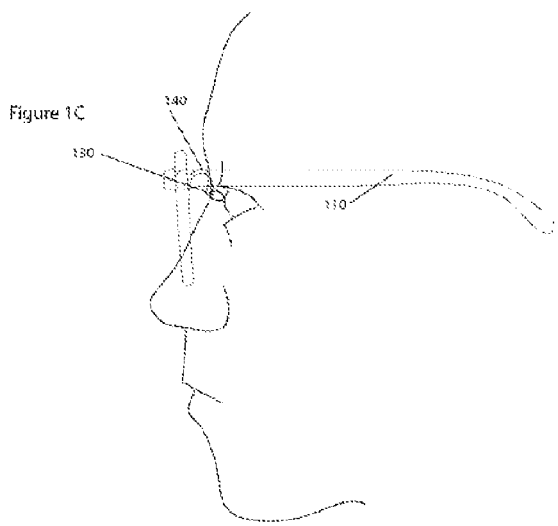
Figure 1B:
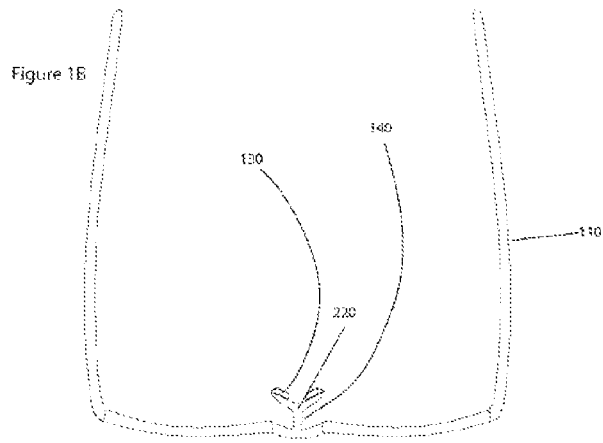

FIGS. 1a, 1b, and 1c are a top, front, and side view of the nose support device piece 100 for eyewear respectively. As shown in FIGS. 1a, 1b, 1c, and FIGS. 2a, 2b, 2c, and 2d, in one preferred embodiment, the nose support device 100 has two adjustable nose pads 130 attached to a cross piece 220 that is perpendicular to an adjustable nose pad arm 140, the adjustable nose pad arm 140 attaching the nose pad 130 to the eyewear frame 110. The nose pads 130 rests on the crook of a nose bridge of a wearer of the eyewear as shown in FIG. 1c. In a preferred embodiment, the cross piece 220 is curvable.

Figure 2A:
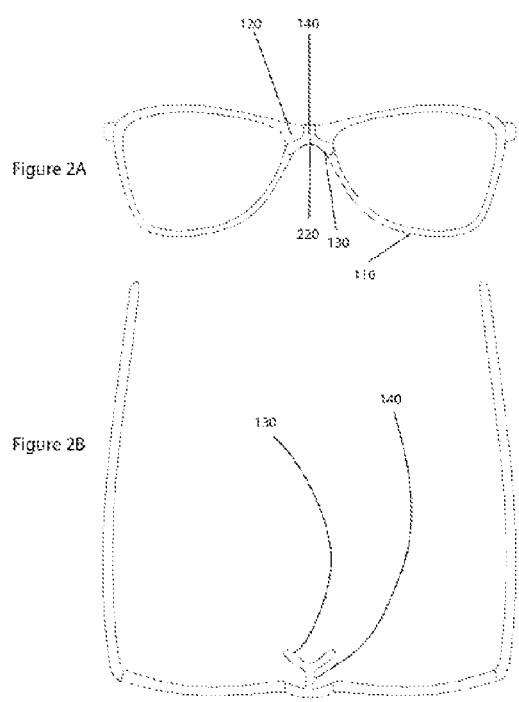
FIGS. 2a, 2b, 2c, and 2d show various components of the nose support piece device including a single nose pad strip.
Figure 2B:
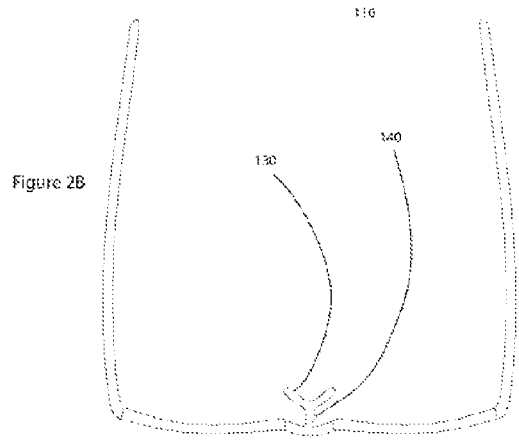
Figure 2C:
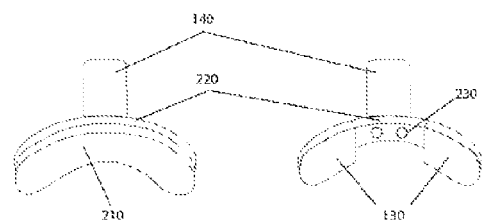

The adjustable nose pad can either be a single long strip pad 210 as shown in FIG. 2c or two pads 130 which are attached to a cross piece 220, to cradle across the nasal bridge, that is perpendicular to the adjustable nose pad arm 140.

Figure 2D:
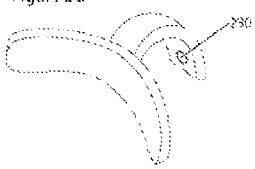
Figure 3A:
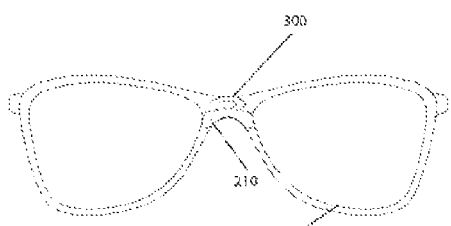
FIGS. 3a, 3b, and 3c show various components of the nose support piece device including a double nose pad arm.
Figure 3C:
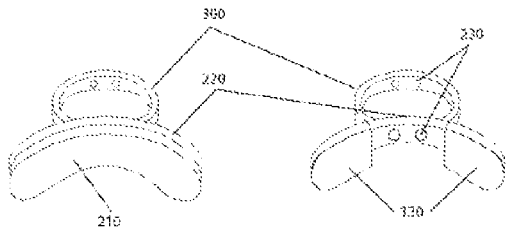
Figure 3B:
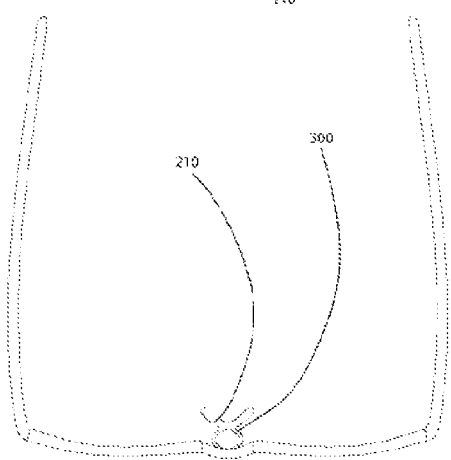

One end of the nose pad arm 140 is attached to the eyewear frame 110, the other to the nose pad cross piece 220. In a preferred embodiment, the adjustable nose pad arm 140 could also be a double piece nose pad arm 300 as depicted in FIGS. 3a, 3b, and 3c. The adjustable nose pad arm 140 can be attached to any part of the eyewear frame 110, on the bridge 120 or the frame rim 110. The pieces can be held in place, but not limited, to screws 230 or welds as depicted in FIG. 2d.

The eyewear support design can be made with various, disparate materials either entirely or in parts, such as, but not limited to, plastic and/or metal.

The eyewear device 100 positions the single 210 or double nose pad 130 on the crook of the bridge, not on the sides of the nose, hence would it fit any face regardless of the size of the wearer's nose or its bridge. This also affords the pad arm/arms to be highly adjustable. The distance between the face and the frame can be adjusted more easily than the existing ones that rely on the nose pads on the sides of the nose or it being in a fixed position. The present invention allows the actual shape and size of eyewear frame to be altered. This alleviates the problem of wearers with low bridge noses and high cheek bones. It enables the frame to be moved away from the wearer's cheeks.

In another embodiment, the nose pad or nose pads is/are not fashioned to substantially rest on the sides of the nose of a wearer of the eyewear.

In a preferred embodiment, the nose pad or nose pads do not rest on the sides of the nose of a wearer of the eyewear.

While the foregoing written description of the invention enables one of ordinary skill to make and use what is considered presently to be, the best mode thereof, those of ordinary skill will understand and appreciate the existence of variations, combinations, and equivalents of the specific embodiment, method, and examples herein.

The invention claimed is:

1. A nose support device for eyewear frame, the nose support device comprising a nose pad attached to a cross piece that is perpendicular to a curved adjustable double piece nose pad arm, wherein, one end of the nose pad arm is attached to the eyewear frame, the other to the nose pad cross piece, wherein the nose pad rests on the crook of a nose bridge of a wearer of the eyewear, wherein the curved adjustable double piece nose pad arm is adjustable to adjust the distance between the eyewear frame and the bridge of the nose.

2. The device of claim 1, wherein the adjustable nose pad arm is attached to a frame of the eyewear.

3. The device of claim 1, wherein the adjustable nose pad arm is adjustable such that the distance between the nose pads and the frame can be adjusted in length.

4. The device of claim 1, wherein the adjustable nose pad arm is adjustable such that the distance between the face of the wearer of the eyewear and the frame of the eyewear can be adjusted in length.

5. A nose support device for eyewear frame, the nose support device comprising two nose pads attached to a cross piece that is perpendicular to a curved adjustable double piece nose pad arm, wherein one end of the nose pad arm is attached to the eyewear frame, the other to the two nose pads cross piece, wherein the two nose pads rest on the crook of a nose bridge of a wearer of the eyewear, wherein the curved adjustable double piece nose pad arm is adjustable to adjust the distance between the eyewear frame and the bridge of the nose.

6. The device of claim 5, wherein the adjustable nose pad arm is adjustable such that the distance between the nose pads and the frame can be adjusted in length.

7. The device of claim 5, wherein the adjustable nose pad arm is adjustable such that the distance between the face of the wearer of the eyewear and the frame of the eyewear can be adjusted in length.

\* \* \* \* \*